(12) United States Patent
Gunter

(10) Patent No.: US 11,113,956 B1
(45) Date of Patent: Sep. 7, 2021

(54) VEHICLE-ROADWAY INTERFACE FOR POWER AND DATA EXCHANGE WITH ROADWAY SENSORS SYSTEM

(71) Applicant: Liam Gunter, Dover, AR (US)

(72) Inventor: Liam Gunter, Dover, AR (US)

( * ) Notice: Subject to any disclaimer, the term of this patent is extended or adjusted under 35 U.S.C. 154(b) by 0 days.

(21) Appl. No.: 17/172,690

(22) Filed: Feb. 10, 2021

(51) Int. Cl.

| | | |
|---|---|---|
| *G08G 1/01* | (2006.01) | |
| *G06F 1/28* | (2006.01) | |
| *G06F 1/16* | (2006.01) | |
| *G01N 27/12* | (2006.01) | |
| *H02J 50/12* | (2016.01) | |
| *H02J 50/80* | (2016.01) | |
| *H02J 50/20* | (2016.01) | |
| *G01K 13/00* | (2021.01) | |
| *G06F 16/29* | (2019.01) | |
| *H02J 50/00* | (2016.01) | |

(52) U.S. Cl.
CPC ............ *G08G 1/0116* (2013.01); *G01K 13/00* (2013.01); *G01N 27/121* (2013.01); *G06F 1/28* (2013.01); *G06F 16/29* (2019.01); *G08G 1/0112* (2013.01); *G08G 1/0125* (2013.01); *H02J 50/001* (2020.01); *H02J 50/12* (2016.02); *H02J 50/20* (2016.02); *H02J 50/80* (2016.02)

(58) Field of Classification Search
CPC .. G08G 1/0116; G08G 1/0112; G08G 1/0125; H02J 50/80; H02J 50/12; H02J 50/20; H02J 50/001; G06F 16/29; G06F 1/28; G01K 13/00; G01N 27/121

See application file for complete search history.

(56) References Cited

U.S. PATENT DOCUMENTS

| | | |
|---|---|---|
| 5,982,325 A | 11/1999 | Thornton |
| 8,452,644 B2 | 5/2013 | Povolny |
| 8,898,485 B2 | 11/2014 | Scott et al. |
| 9,020,742 B2 | 4/2015 | Neel et al. |
| 9,472,096 B2 | 10/2016 | Claudel |
| 9,478,129 B1* | 10/2016 | Kothari ................ G08G 1/0145 |
| 9,702,098 B1* | 7/2017 | King .................... G08G 1/0116 |
| 9,959,754 B1 | 5/2018 | King |
| 2004/0098187 A1 | 5/2004 | Nakao |
| 2007/0223966 A1 | 9/2007 | Fujimoto |
| 2017/0183832 A1* | 6/2017 | Moran ............. G08G 1/096741 |
| 2018/0003792 A1* | 1/2018 | McCafferty ...... G08G 1/096716 |
| 2020/0195723 A1* | 6/2020 | Bass ................... H04L 67/2842 |

* cited by examiner

*Primary Examiner* — Alexander Satanovsky
*Assistant Examiner* — Lynda Dinh
(74) *Attorney, Agent, or Firm* — Rashauna Norment

(57) ABSTRACT

A vehicle-roadway interface for power and data exchange with roadway sensors system used along a road surface for use with at least one vehicle, with the system comprising at least one active vehicle-based adapter removably mounted to the at least one vehicle and a plurality of passive roadway-based beacons affixed to or within the road surface. The system utilizes an innovative transmitted power system that allows the vehicle-based adapter to provide power to each of the roadway beacons whenever the equipped vehicle passes within proximity of the roadway beacon, while the vehicle is normally traveling along the roadway. Each of the roadway-based beacons communicates in real time with the vehicle-based adapter to detect, collect, transmit, and receive information concerning at least temperature conditions, moisture conditions, lane management, traffic management, record-keeping of passing vehicles, and high-fidelity geographic location coordinates.

15 Claims, 8 Drawing Sheets

VEHICLE-ROADWAY INTERFACE FOR POWER AND DATA EXCHANGE WITH ROADWAY SENSORS SYSTEM

CROSS-REFERENCE TO RELATED APPLICATIONS

Not applicable.

FEDERALLY SPONSORED RESEARCH AND DEVELOPMENT

Not applicable.

BACKGROUND OF THE INVENTION

1. Field of the Invention

The present invention generally relates to a vehicle-roadway interface for power and data exchange with roadway sensors system for use along a roadway and with at least one vehicle, wherein the system comprises at least one active vehicle-based adapter coupled to a vehicle forming an equipped vehicle and a plurality of passive roadway-based beacons each positioned along the roadway, with each of the passive roadway-based beacons communicating in real time with the active vehicle-based adapter to detect, collect, transmit, and receive information concerning at least temperature conditions, moisture conditions, lane management, traffic management, record-keeping of passing vehicles, and high-fidelity geographic location coordinates; and wherein the active vehicle-based adapter provides an innovative transmitted power system for powering each of the roadway-based beacons.

2. Description of Arguably Related Art Including Information Disclosed for 37 CFR 1.97 and 1.98

Conventional pavement markers may be positioned along a road. Some of these conventional markers may transmit information to a central location often via a driver's visual cognition. These conventional markers do not actually transmit digital information to an equipped vehicle. These conventional markers generally send information by virtue of being reflective, and fail to transmit digital information in real time to a source, regardless of the driver's awareness of a particular marker. A further challenge with existing conventional pavement markers is power limitations for powering the pavement markers. Technology used with the conventional pavement markers are not currently employed to collect, store, receive, and transmit at least temperature information concerning the road and the environment, moisture information concerning the road, lane management information, traffic management information, geographic positioning location in GNSS or GPS-denied navigation environment, and vehicle traffic records.

With the advancement of autonomous and semi-autonomous vehicles, effective and accurate operation of navigation systems is a necessity for private and public roadway transit. The United States' Global Positioning System (GPS), Global Navigation Satellite Systems (GNSS), and onboard inertial navigation systems (INS) are conventional methods for determining a vehicle's position on a roadway. It is understood that a GNSS-denied navigation environment and a GNSS-available navigation environment includes, but is not limited to, -denied and -available environments for GPS, Russia's Global Navigation Satellite System (GLO-NASS), European Union's Galileo, and China's BeiDou Navigation Satellite System (BDS), respectively. Depending on various conditions, the accuracy, reliability, and dependability of determining the vehicle's position via these methods is deficient. Examples of GNSS-denied navigation environments include, but are not limited to, underground roadways and tunnels where line of sight to the sky is impossible; areas with increased amounts of infrastructure of buildings, bridges, and towers; and direct or intentional interference or jamming of the satellite signal. GNSS-denied navigation environments pose significant problems when utilizing conventional navigation systems.

The King Patent (U.S. Pat. No. 9,959,754) discloses a traffic control system and method in which a sensor and a processor interact with at least one road module to illuminate and/or cause to flash in response to predetermined road surface and/or traffic conditions. The system and method can be configured to interact with vehicles, including autonomous vehicles, traveling on the road in which the road modules(s) are embedded. King discloses detecting temperature and precipitation. It also communicates flashing lighted warnings to approaching vehicles or changing module color to advise vehicles of hazardous road surface conditions. A pavement marker module comprises a housing, a light source, a light guide, an energy storage system, and a charging system. The housing has reflective portions. The pavement marker module is configured for attachment to a mount surface. The housing has at least one cavity for receiving components. The storage system provides electrical power to the light source, and is electrically connected to a charging system for permitting the energy storage system to be recharged. The system has a central processing unit and includes memory, timers, sensors, transmitters, receivers, and/or data recording. It further discloses a passive interaction system in which the road module sensor connected to a road module system is configured to detect an oncoming vehicle.

The Green Patent Application (U.S. Patent Application Publication No. 2007/0223966) discloses a roadside marker comprises a light-emitting element, an electronic circuit connected to the light-emitting element, a battery connected to the electronic circuit, a photovoltaic cell electrically connected to the battery, and an actuator for causing the electronic circuit to transmit a signal to a remote location. The markers may include lane markers and/or temporary or permanent roadside markers that are either free standing or attached to guardrails or other structures. It also discloses a microprocessor, a modulator, a transceiver, rewritable memory, and a solid-state accelerometer, or micro-mechanical sensor. The marker could also be activated by road maintenance crews. Each marker would have various parameters programmed into it after installation, such as a unique beacon identification serial number, flash frequency and color for distinguishing between lane markers and roadside markers, and the flash duration before automatically deactivating. Green discloses a GPS-enabled laptop that has a beacon registration database. A vehicle equipped with the GPS-enabled laptop is capable of calculating the location, whether exact or approximate, of each marker based upon the marker transmitting its unique identifier and its emergency contact information code to the beacon registration database.

The Thornton Patent (U.S. Pat. No. 5,982,325) discloses an apparatus and method for monitoring real time road conditions. The invention has remote units with computers having GPS receivers for detecting location, and having sensors for detecting environmental information. Each remote unit has a transceiver that transmits environmental information via a wireless communication system to a base station. Thornton utilizes the convergence of technologies such as GPS, automated vehicle location (AVL), wireless database communications, and voice response units. AVL determines the current location of a vehicle and may utilize an assortment of sensors and an on-board computer to determine environmental data. The data is transmitted wirelessly to a monitoring site. Thornton discloses a remote unit being attached to a vehicle along with monitoring components and transmitting components. A second category has components that reside at a base station. The remote unit has the AVL that is operably connected to a GPS antenna, a plurality of sensors distributed about the vehicle, and a transceiver for communication with the base station.

None of the identified patent references disclose, teach, or suggest the combination of components and structural arrangement of the claimed invention.

A need exists for a vehicle-roadway interface for power and data exchange with roadway sensors system capable of collecting, detecting, transmitting, and receiving information in real time between an active vehicle-based adapter equipped vehicle and a plurality of passive roadway-based beacons concerning the temperature and moisture conditions of the road, the geographic location position of the roadway-based beacon, record-keeping data of passing vehicles, and lane and traffic management.

A need exists for a vehicle-roadway interface for power and data exchange with roadway sensors system wherein an active vehicle-based adapter equipped vehicle powers and initiates communication with each of a plurality of passive roadway-based beacons as the equipped vehicle passes each of the roadway-based beacons, with the active vehicle-based adapter transmitting at least one data request to and receiving at least one data packet from each of the plurality of roadway-based beacons with information about the roadway environmental conditions, lane information, traffic information, vehicle information, and geographic position of a particular roadway-based beacon on the roadway.

A need exists for a vehicle-roadway interface for power and data exchange with roadway sensors system having a plurality of passive roadway-based beacons, each of which has static high-fidelity positioning member therein to provide independent accurate geographic location of the respective roadway-based beacon in both GNSS-denied navigation environments and GNSS-available navigation environments, wherein the geographic location is transmitted to an active vehicle-based adapter on an equipped vehicle as part of a data packet.

SUMMARY OF THE INVENTION

Due to the described disadvantages inherent in the known types of roadway information systems, the present invention provides a new and improved vehicle-roadway interface for power and data exchange with roadway sensors system that utilizes a plurality of passive roadway-based beacons positioned along a roadway to provide roadway information in real time to vehicles equipped with at least one active vehicle-based adapter. Essentially two nodes operate the system. A first node of the system is the active vehicle-based adapter that provides power to and that sends out intermittent vehicle data requests to each of the plurality of the passive roadway-based beacons as an equipped vehicle passes a particular roadway-based beacon. A second node of the system is the plurality of passive roadway-based beacons that each receives power from and sends replies to the adapter data requests with a beacon data packet. The invention is a cost-effective and efficient multi-purpose system for managing details concerning road and traffic conditions, and for enabling additional functionality to conventional pavement markers that are raised above, recessed or depressed within, or flush with the roadway surface.

The active vehicle-based adapter part of the system provides an innovative power transmission system for wirelessly powering each of the passive roadway-based beacons. Other conventional systems require communicating to a central location. Yet other conventional power systems require that a roadway beacon be responsible for its own power. Here, the equipped vehicle transmits power directly and wirelessly to each of the roadway-based beacons. The active vehicle-based adapter is a distributed, mobile node in the system rather than using a conventional centralized, stationary node in the system.

The two nodes of the system interact with each other to generate the ascribed results. The system comprises (including or having) at least one active vehicle-based adapter removably mounted to a vehicle and a plurality of passive roadway-based beacons each spaced apart and affixed along a roadway or road surface, wherein the system is used to detect, collect, and transmit digital information in at least one data packet in real time to the at least one vehicle-based adapter concerning temperature conditions, moisture conditions, lane management, traffic management, vehicle record-keeping, and the geographic location of each of the plurality of passive roadway-based beacons in at least GNSS-denied navigation environments, and wherein the at least one active vehicle-based adapter wirelessly powers each of the plurality of passive roadway-based beacons.

The active vehicle-based adapters may be utilized by driver-operated, autonomous, and semi-autonomous vehicles. Each vehicle-based adapter may be either installed onto or within a vehicle by a manufacturer or retrofitted by an end user to become an equipped vehicle. Authorized or privileged users of equipped vehicles may make not only selective adjustments to at least a lane management data structure of the roadway-based beacon, but also may receive confidential, encrypted information from a record-keeping data structure of the roadway-based beacon. Examples of authorized or privileged users include, but are not limited to, construction personnel, emergency responders, government agents, government contractors, or other authorized personnel. A beacon data packet is transmitted once per exchange with an equipped vehicle.

In one embodiment, the invention is a vehicle-roadway interface for power and data exchange with roadway sensors system for use on a roadway or a road surface with at least one vehicle, the system comprising:

a. a first node of the system having at least one active vehicle-based adapter removably mounted to the at least one vehicle forming an at least one equipped vehicle and a second node of the system having a plurality of passive roadway-based beacons each being affixed to or within the road surface;

b. the at least one active vehicle-based adapter comprising:
  i. a power emitting antenna providing a direct wireless beacon power source to a power harvesting antenna of each of the plurality of passive roadway-based beacons during interactive close proximity between the at least one equipped vehicle and each of the plurality of passive roadway-based beacons, and coupling to an existing power and data bus of the at least one equipped vehicle for use as an adapter power source for the at least one active vehicle-based adapter;

ii. an adapter communication antenna having an adapter transceiver for dual directional transmission of an at least one vehicle data request to each of the plurality of passive roadway-based beacons and receipt of an at least one beacon data packet from each of the plurality of roadway-based beacons; and iii. an adapter processing member coupled to the adapter transceiver and to a vehicle interface for processing information obtained from the at least one beacon data packet and providing one or more commands through the at least one vehicle data request to each of the plurality of passive roadway-based beacons;

c. each of the plurality of passive roadway-based beacons comprising:

i. a temperature sensor for detecting an ambient temperature and a road surface temperature in real time and transmitting as a temperature data;

ii. a moisture sensor for detecting a moisture condition of the road in real time and transmitting as a moisture data;

iii. the at least one beacon data packet having the temperature data, the moisture data, at least one lane data containing a lane management data structure for storing static data and dynamic data in real time, a record data containing a record-keeping data structure for collecting and storing information about the at least one equipped vehicle which interacts and engages with the plurality of passive roadway-based beacons in real time, and a location data having a high-fidelity positioning record for use in an at least GNSS-denied navigation environment;

iv. the power harvesting antenna obtaining power from the power emitting antenna for powering at least a beacon processing member, a beacon transceiver, and a beacon nonvolatile memory;

v. the beacon communication antenna having the beacon transceiver for dual directional transmission of the at least one beacon data packet and receipt of the at least one vehicle data request wirelessly in real time during interaction with the at least one equipped vehicle;

vi. the beacon processing member being coupled to the beacon transceiver and the beacon nonvolatile memory; and d. wherein the at least one active vehicle-based adapter remains in an idle state as power is continuously transmitted from the power emitting antenna, or between vehicle information updates, or sending the at least one vehicle data request to each of the plurality of passive roadway-based beacons in close proximity with the at least one active vehicle-based adapter;

e. wherein if no response is received and the at least one vehicle data request delay times out, the at least one active vehicle-based adapter sends an additional at least one vehicle data request, and if a response is received, then the at least one vehicle-based adapter utilizes the received data from the respective plurality of passive roadway-based beacons before returning back to its idle state, and wherein, alternatively, if the vehicle information update delay times out, the vehicle information is updated, and wherein after the at least one equipped vehicle no longer supplies power to the at least one active vehicle-based adapter through the vehicle interface, the at least one active vehicle-based adapter will power off;

f. wherein upon interaction or pinging with the power emitting antenna, the power harvesting antenna of each of the plurality of passive roadway-based beacons receives enough transmitted power to activate an idle beacon microcontroller, the beacon transceiver, the beacon nonvolatile memory, the temperature sensor, and the moisture sensor to take measurements and to retrieve data for the at least one beacon data packet;

g. wherein the at least one vehicle data request is intermittent and is received by the beacon communication antenna and processed to determine the authority of the at least one equipped vehicle, with pertinent authorized information being stored in the beacon nonvolatile memory;

h. wherein in response, each of the plurality of passive roadway-based beacons transmits the at least one beacon data packet through the beacon communication antenna which contains the appropriate data collected during activation to the at least one vehicle-based adapter's adapter communication antenna; and i. wherein whenever the distance between the at least one vehicle-adapter and the power harvesting antenna of each of the plurality of roadway-based beacons exceeds the ping or interaction range for the power harvesting antenna, each of the plurality of passive roadway-based beacons suspends data collection activity and powers down to an idle state until later powered and requested by a different the at least one equipped vehicle.

Further still in this embodiment, the power emitting antenna of the at least one active vehicle-based adapter further comprises an oscillator for transmitting power in a high frequency range to the power harvesting antenna of the roadway-based beacon, and an adapter regulator for controlling the amount of power used to operate the vehicle adapter. An adapter processing member comprises an adapter microcontroller coupled to the adapter transceiver and the vehicle interface for processing the beacon data packet and the vehicle data request. The power harvesting antenna of each of the plurality of roadway-based beacons further comprises a rectifier and a beacon regulator for rectifying and regulating the received power to a stable, low DC voltage power source for the roadway-based beacon. The adapter and beacon communication antennas further comprise an ultra high frequency antenna or a super high frequency antenna to transmit and to receive the beacon data packet and the vehicle data request.

The roadway-based beacon provides an enhancement for conventional pavement markers that are already on the roadway or that may be later installed on the roadway. The roadway-based beacons may be raised, recessed, or flush with the roadway surface. Each of the roadway-based beacons may be easily and quickly positioned along the road. Each roadway-based beacon is pinged by or communicates with the vehicle-based adapter as the equipped vehicle passes by the roadway-based beacon. During the ping or interaction with a roadway-based beacon, the vehicle-based adapter provides power to the roadway-based beacon and transmits intermittent vehicle-based adapter data requests ("vehicle data request") with self-reported information to the roadway-based beacon. The self-reported information transmitted by the vehicle-based adapter includes information about the vehicle's VIN, velocity, and the time the vehicle pinged the roadway-based beacon. Also during the ping or interaction with the roadway-based beacon, the vehicle-based adapter receives a roadway-based beacon data packet ("beacon data packet") from the roadway-based beacon with the information about road conditions and location for a particular part of the roadway. The beacon data packet includes specific roadway-based beacon information including its unique identifiers, static data, and dynamic data, all of which the equipped vehicle can process and store.

It is an object of the invention to provide a vehicle-roadway interface for power and data exchange with roadway sensors system wherein an active vehicle-based adapter powers and initiates communication with each of a plurality of passive roadway-based beacons as the equipped vehicle passes each of the roadway-based beacons, with the vehicle-based adapter transmitting and receiving data packets to and from each of the plurality of roadway-based beacons with information about the roadway environmental conditions, lane information, traffic information, vehicle information, and geographic position of a particular roadway-based beacon on the roadway.

It is another object to provide a vehicle-roadway interface for power and data exchange with roadway sensors system having a plurality of passive roadway-based beacons, each of which has a static high-fidelity positioning member therein to provide independent accurate geographic location of the roadway-based beacon in both GNSS-denied navigation environments and GNSS-available navigation environments, wherein the geographic location is transmitted to an active vehicle-based adapter on an equipped vehicle as part of a data packet.

It is an object of the present invention to provide a vehicle-roadway interface for power and data exchange with roadway sensors system capable of collecting, detecting, transmitting, and receiving information in real time between an active vehicle-based adapter and a plurality of passive roadway-based beacons concerning the temperature and moisture conditions of the road, geographic location position of the roadway-based beacon, record-keeping data of passing vehicles, lane management, and traffic management.

These and other aspects, objects, embodiments, and advantages of the invention will become apparent from the accompanying drawing figures and the following detailed description of the preferred embodiments of the invention.

BRIEF DESCRIPTION OF THE SEVERAL VIEWS OF THE DRAWING

The invention may be more readily described by reference to the accompanying drawing figures and the following description of the drawing figures. The reference numbers apply to each embodiment of the invention. In the drawing.

DETAILED DESCRIPTION OF THE INVENTION

Figure 1:
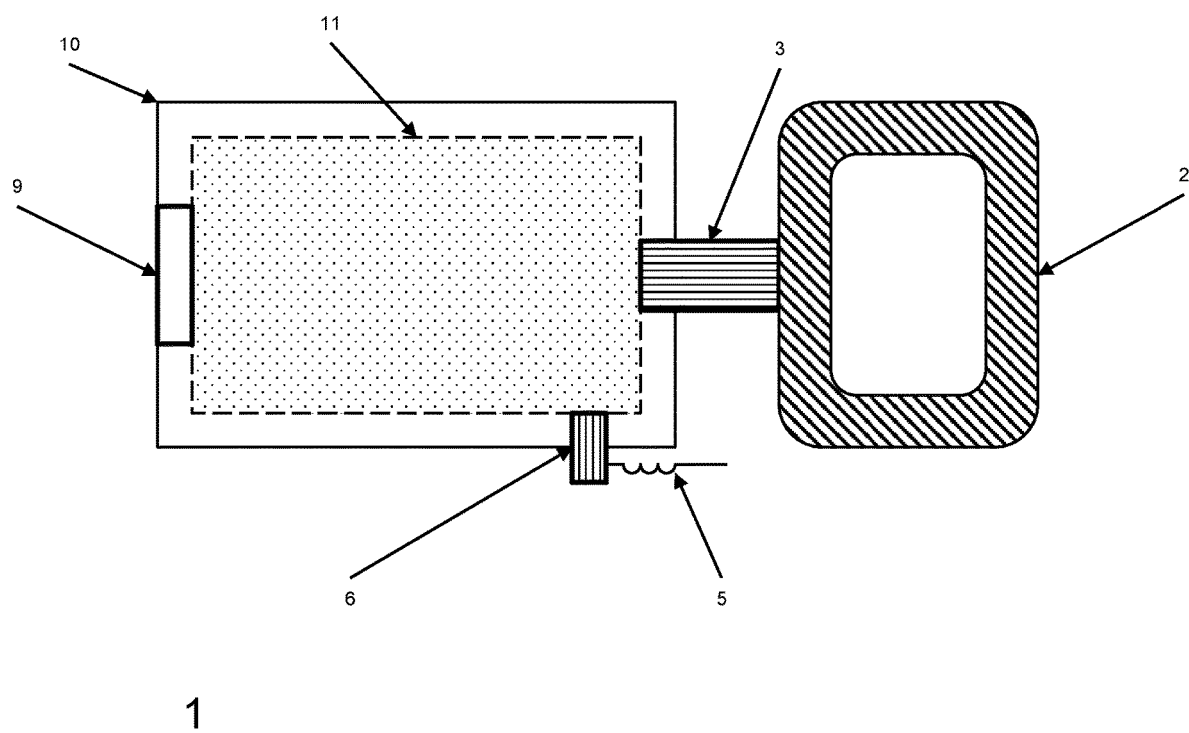
FIG. 1 is a top view of a vehicle-based adapter for the system.

The present invention, preferred embodiments of the invention, and the accompanying drawing figures as described herein should not be construed as limited to the illustrated drawing. Rather, the illustrated embodiment(s) are detailed to provide a thorough disclosure suitable to convey the scope of the invention to those skilled in the art. For the sake of simplicity, the conjunctive "and" may also be taken to include the disjunctive "or" and vice versa, whenever necessary to give the claims of this patent application the broadest interpretation and construction possible.

Referring more particularly to the drawing by characters of reference, the figures depict a preferred embodiment of the invention. More particularly, the invention is a vehicle-roadway interface for power and data exchange with roadway sensors system for use on a roadway or road surface and with at least one vehicle, the system comprising (including or having) a first node having at least one active vehicle-based adapter 1 and a second node having a plurality of passive roadway-based beacons 15, wherein the at least one active vehicle-based adapter 1 comprises a first adapter antenna 2 (high frequency) that provides power to each of the plurality of passive roadway-based beacons 15 during a ping or interaction with the roadway-based beacon, a second adapter antenna 5 (ultra high frequency or super high frequency) in communication with each of the plurality of passive roadway-based beacons 15 to receive a beacon data packet from each roadway-based beacon and to transmit a vehicle-adapter data request, an adapter microcontroller 7, an adapter transceiver 8, a vehicle interface 9, an adapter oscillator 12, an adapter regulator 13, and an adapter non-volatile memory 14; and wherein each of the plurality of passive roadway-based beacons 15 comprises a temperature sensor 24 for detecting the temperature conditions of the roadway and of the environment in real time as part of a sensor data, a moisture sensor 25 for detecting the moisture conditions of the roadway and of the environment in real time as part of the sensor data, a lane management data structure for storing static data and dynamic data concerning lane management and traffic management for the roadway in real time as a lane data, a record-keeping data structure for collecting and storing information about the equipped vehicles as those equipped vehicles interact with each of the plurality of passive roadway-based beacons on the roadway in real time as a record data, a high-fidelity positioning record for providing the geographic location of each of the plurality of roadway-based beacon in at least GNSS-denied navigation environments as a location data, a first beacon antenna 16 (high frequency) for powering each roadway-based beacon from the first adapter antenna, and a second beacon antenna 19 (ultra high frequency or super high frequency) for transmitting the beacon data packet via the second adapter antenna 5 with the beacon data packet containing the detected and collected information and for receiving the vehicle data request via the second adapter antenna 5, with each of the plurality of roadway-based beacons 15 further comprising a rectifier 17, a beacon regulator or power regulator 23, a beacon microcontroller 20, a beacon nonvolatile memory 21, and a beacon transceiver 22. The vehicle data request and the beacon data packet may further include encrypted communication. The collected information is essentially the sensor data, the lane data, the record data, and the location data.

The first node of the system is the at least one active vehicle-based adapter. As depicted in FIGS. 1, 2, 9, and 10, each active vehicle-based adapter ("vehicle adapter") 1 has a first adapter antenna 2 having an adapter power supply 4, a second adapter antenna 5, an adapter microcontroller 7, an adapter nonvolatile memory 14, an adapter transceiver 8, a vehicle interface 9, and at least one vehicle data request. The vehicle adapter's antennas and electronic components are contained, in whole or in part, within an electronics enclosure 10. Each equipped vehicle has at least one vehicle adapter ("equipped vehicle"), although at least two vehicle adapters are preferred. When an equipped vehicle has two vehicle adapters, the two vehicle adapters are independent and provide double the information throughput with the plurality of passive roadway-based beacons, enumerating up to three lanes of data total. Each vehicle adapter may be installed on or retrofitted to consumer vehicles and authorized or privileged vehicles. Examples of authorized or privileged users or vehicles include, but are not limited to, construction personnel, emergency responders, government agents, government contractors, government-approved agency vehicles, and other third-party approved vehicles or other authorized personnel.

As depicted in FIG. 1, the vehicle adapter 1 electronics enclosure 10 contains the electronic components and other components of the vehicle adapter 1. "Electronic components" refer to the respective microcontrollers, transceivers, nonvolatile memory, oscillator (for vehicle adapter), and rectifier (for roadway beacon). The electronics enclosure 10 is of a modular, plug-in design for easy removal or replacement. The electronics enclosure 10 is removably mounted on a lower portion of the vehicle so that the vehicle adapter is in close proximity to the road surface. Examples of a lower portion of the vehicle include without limitation, the vehicle chassis, in the wheel well, the bumper, the doors, or the runners. Mounting the vehicle adapter on a lower position on the vehicle further allows the vehicle adapter to supply power more efficiently to each of the plurality of passive roadway-based beacons.

As depicted in the figures, the active vehicle-based adapter 1 has a first adapter antenna 2 that sends or otherwise provides power to the adapter power supply 4 to each passive roadway-based beacon's 15 first beacon antenna 16 as the equipped vehicle passes by and pings a particular roadway-based beacon 15. The first adapter antenna 2 is essentially a power emitting antenna 2 with an oscillator 12 (or adapter oscillator) that powers a beacon rectifier 17 of the roadway-based beacon 15. The power emitting antenna 2 has a power emitting antenna cable assembly 3 coupled to an electronics board 11 and is powered by the vehicle's power and data bus system. The power emitting antenna 2 nominally operates in a high frequency radio regime. Power is continuously transmitted from the power emitting antenna 2. The high frequency range may approximately span from 3.0 MHz-30 MHz. 10 MHz is the preferred high frequency for the power emitting antenna. As the vehicle adapter 1 and the roadway-based beacon 15 come into close physical proximity to start the ping or interaction, the vehicle adapter's power emitting antenna 2 powers a power harvesting antenna 16 of the roadway-based beacon 15.

The vehicle adapter 1 has an adapter regulator 13 that controls the input vehicle power as it provides power to the adapter components that comes from the vehicle interface 9. The vehicle adapter simultaneously transmits power to the roadway-based beacon. The vehicle adapter's oscillator 12 sources power from the vehicle power and data bus, then converts and transmits such power through the power emitting antenna 2 as a 10 MHz signal. The power harvesting antenna 16 of the roadway beacon 15 receives the signal, which the rectifier 17 converts into the power needed to initiate and operate the roadway-based beacon components. The roadway-based beacon 15 further includes a beacon regulator 23 to control the power received. With this system, the equipped vehicle is responsible for powering each roadway beacon that it pings, thereby minimizing costs of the overall system.

The active vehicle-based adapter 1 has a second adapter antenna 5 that provides dual directional communication for both receiving and transmitting data from and to each of the passive roadway-based beacons 15. Preferably, each vehicle is equipped with at least one vehicle-based adapter for dual directional information transfer to and from the roadway-based beacons in real time. In a preferred embodiment, the second adapter antenna 5 is essentially an adapter communication antenna 5. The adapter communication antenna 5 nominally operates in an ultra high frequency or super high frequency radio regime. The ultra high frequency range spans approximately 300 MHz-3 GHz. The super high frequency range spans approximately 3 GHz-30 GHz. 2.45 GHz is the preferred ultra high frequency range for the communication antennas. 5.8 GHz is the preferred super high frequency range for the communication antennas. As depicted in FIG. 1, the adapter communication antenna has a communication antenna cable assembly 6 that is coupled to the electronics board 11.

Equipping vehicles with two separate vehicle-based adapters allow for double the communication links with the roadway-based beacons. When two or more vehicle-based adapters are used, each vehicle-based adapter is removably mounted at a different location on the vehicle from the other. Preferably a single vehicle adapter is installed on each side of the vehicle chassis. Using two vehicle adapters allows the system to ping or communicate with multiple roadway beacons simultaneously. For example, an equipped vehicle having two vehicle adapters can simultaneously communicate with two independent roadway-based beacons separating the lanes on either side of the vehicle. Doubling the communication links provides a means for interpolating the physical condition of the equipped vehicle along with communicating information about other physical measures, namely, temperature, moisture, lane management, and traffic management. Additionally, doubling the communication links allows the system to read and update up to three lanes for traffic control and for recording information.

The electronic components of the vehicle adapter 1 include an adapter microcontroller 7, an adapter transceiver 8, a vehicle interface 9, an oscillator 12, an adapter regulator 13, and an adapter nonvolatile memory 14. The vehicle adapter microcontroller 7 is coupled to and communicates with the adapter transceiver 8 and with the vehicle interface 9. The vehicle may interact with the vehicle adapter 1 through the vehicle adapter's 1vehicle interface 9 using software for engaging with the vehicle data request and the beacon data packet, and for sending commands via the adapter communication antenna 5 to the roadway-based beacon 15. The vehicle adapter's 1 nonvolatile memory 14, for example, EEPROM, may be soldered onto a printed circuit board or other electronics board 11.

Figure 2:
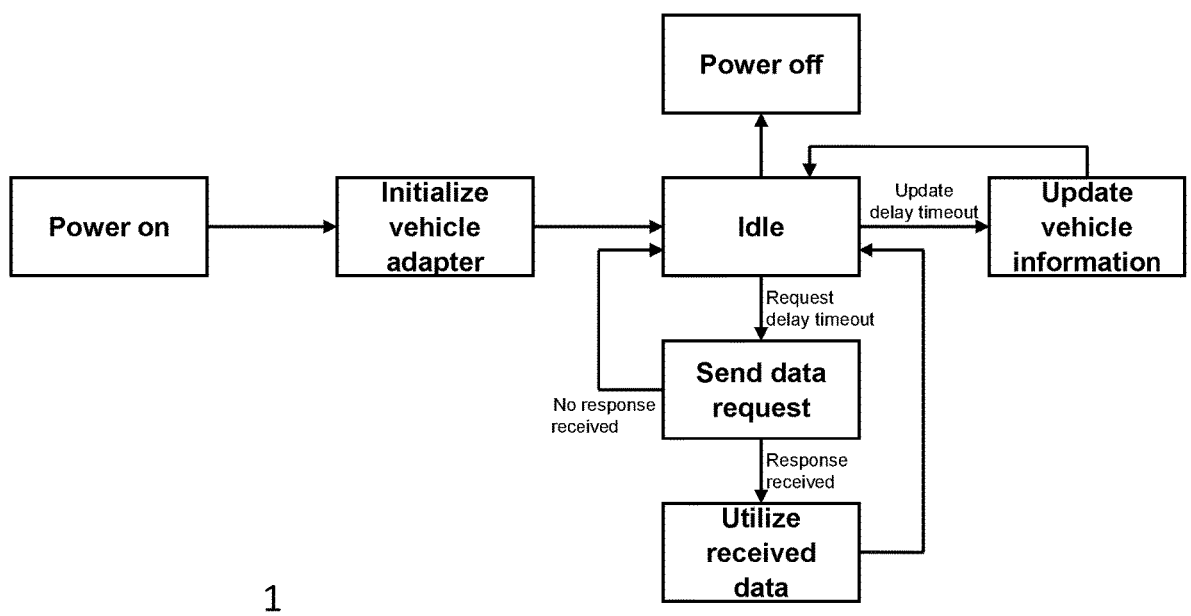
FIG. 2 is a schematic showing the process of the vehicle-based adapter from a power on state to a power off state.
Figure 3:
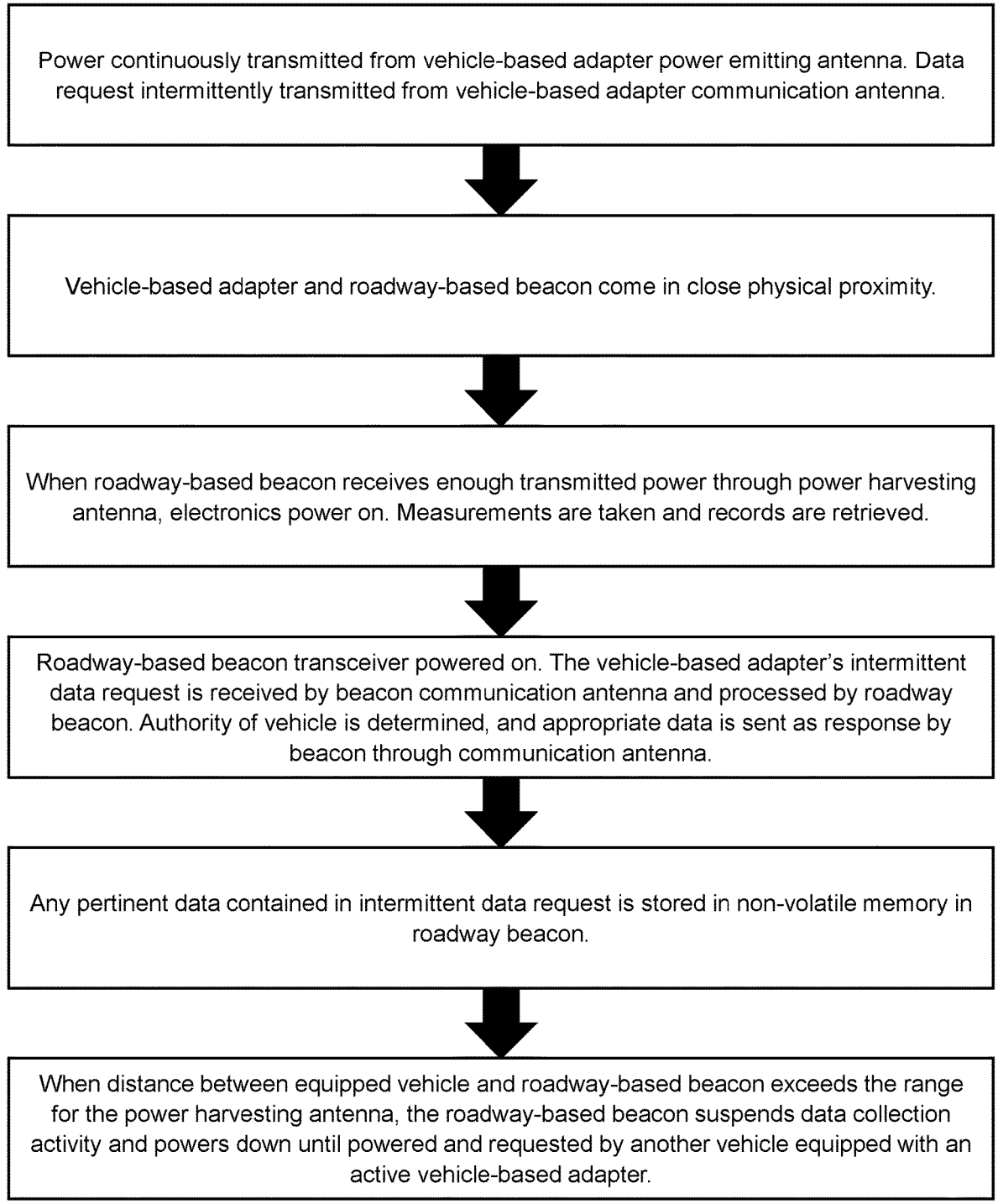
FIG. 3 is a flowchart showing the steps of a single interaction between the vehicle-based adapter portion of the system and the roadway-based beacon portion of the system.

As noted in FIGS. 2-3, as an equipped vehicle approaches at least one roadway-based beacon 15, the vehicle adapter 1 continuously transmits power from its power emitting antenna 2. A vehicle data request is intermittently transmitted from the adapter communication antenna 5. When the vehicle adapter 1 and the roadway beacon 15 come into close physical proximity with each other, the vehicle adapter 1 power emitting antenna 2 powers the roadway beacon 15 via the power harvesting antenna 16. Once the roadway beacon receives enough transmitted power through the power harvesting antenna, the beacon's electronics power on. Measurements are taken from the sensors and records are retrieved.

The vehicle adapter's intermittent data request is transmitted from its adapter communication antenna 5 and is received by the beacon communication antenna 19 for processing. Authority of the equipped vehicle is determined and appropriate data is sent as a response by the beacon through the beacon communication antenna 19. Any pertinent data contained in the intermittent vehicle data request is stored in the roadway beacon's 15 nonvolatile memory 21. When the distance between the equipped vehicle and the particular roadway beacon 15 exceeds the range for the power harvesting antenna 16, the roadway beacon 15 suspends data collection activity and powers down until powered and requested by another vehicle equipped with at least one active vehicle adapter 1.

For general consumers with nonauthorized equipped vehicles, the consumer vehicle adapter nominally receives a beacon data packet from the roadway beacon concerning the road's temperature conditions, moisture conditions, any lane management information, and any traffic management information. The beacon data packet further includes the geographic location for navigation purposes that is beneficial in at least GPS-denied environments or GNSS-denied navigation environments. In yet another embodiment, the beacon data packet may further include a high-fidelity positioning record for providing the geographic location of the roadway-based beacon in GPS-available environments or GNSS-available navigation environments as location data.

For authorized equipped vehicles, the vehicle adapter includes all the features from the consumer vehicle adapter in addition to including encrypted communication and identification verification so that authorized and privileged users may change any restricted information of the roadway beacons. As the equipped vehicle passes each of the selected roadway beacons, the authorized user may control at least the dynamic lane management of the roadway beacons and may obtain confidential traffic vehicle records from the roadway beacon. The authorized user may update the system parameters in real time via the vehicle interface.

The second node of the system is the plurality of passive roadway-based beacons 15. As depicted in FIGS. 4-9, each roadway beacon 15 comprises a first beacon antenna 16, a power regulator 23, a beacon power supply 29, a second beacon antenna 19, at least one environment sensor 24, 25, a beacon microcontroller 20, a beacon nonvolatile memory 21, a beacon transceiver 22, a lane management data structure, a record-keeping data structure, and a high-fidelity positioning record. Two environment sensors are preferred, namely, a temperature sensor 24 and a moisture sensor 25. The electronic components may be coupled to a printed circuit board 26. The roadway-based beacon's antennas, sensors, and electronic components are contained, in whole or in part, within a beacon housing 27. The beacon microcontroller 20 is coupled to each environment sensor 24, 25, the beacon transceiver 22, and the beacon nonvolatile memory 21. Each of the passive roadway-based beacons 15 ("roadway beacon") is assembled, mounted, or affixed along the roadway. After installation, each roadway-based beacon is initialized with specific lane management information and high-fidelity position information. The specific lane management information and the high-fidelity position information of the roadway beacon is permanently stored in the roadway beacon's memory.

Each roadway beacon is selectively positioned at regular or irregular intervals at desired locations along the road or a particular lane. The exact or preferred spacing interval of each roadway beacon may differ by governing agency or other regulation. Each roadway beacon is powered by and communicates with any equipped vehicle to keep a live stream of data flowing to and from the passing equipped vehicle. The data that the vehicle adapter's 1 microcontroller 7 reads is asynchronously pushed onto the vehicle's internal electronic communication bus. The equipped vehicle can then utilize or discard the data on its own time frame and according to its own protocols.

As depicted in FIGS. 4-7, the roadway beacon housing 27 has a top, two opposing side walls, a front wall, a rear wall, and a bottom. The top of the housing is preferably flat. The two side walls, the front wall, and the rear wall are essentially identical. The housing walls may each decline at an angle from the top of the housing. The housing is preferably a hard or rigid, durable shell that encloses almost all or at least a substantial part of the components of the roadway beacon. The housing shell may be constructed from ABS, PLA, or other structural plastic. The housing is waterproof and shock-proof. The design of the housing structure may be manufactured using any economical means including 3D printing or injection molding. The bottom of the housing has an adhesive member to affix or otherwise mount the housing onto or within the roadway. The housing 27 defines a single, hollow, interior cavity 18 for containing, in whole or in part, the temperature sensor 24, the moisture sensor 25, the first beacon antenna 16, the second beacon antenna 19, and the other electronic components. The roadway beacon 15 further includes a printed circuit board 26 to which the electronic components are coupled.

Figure 4:
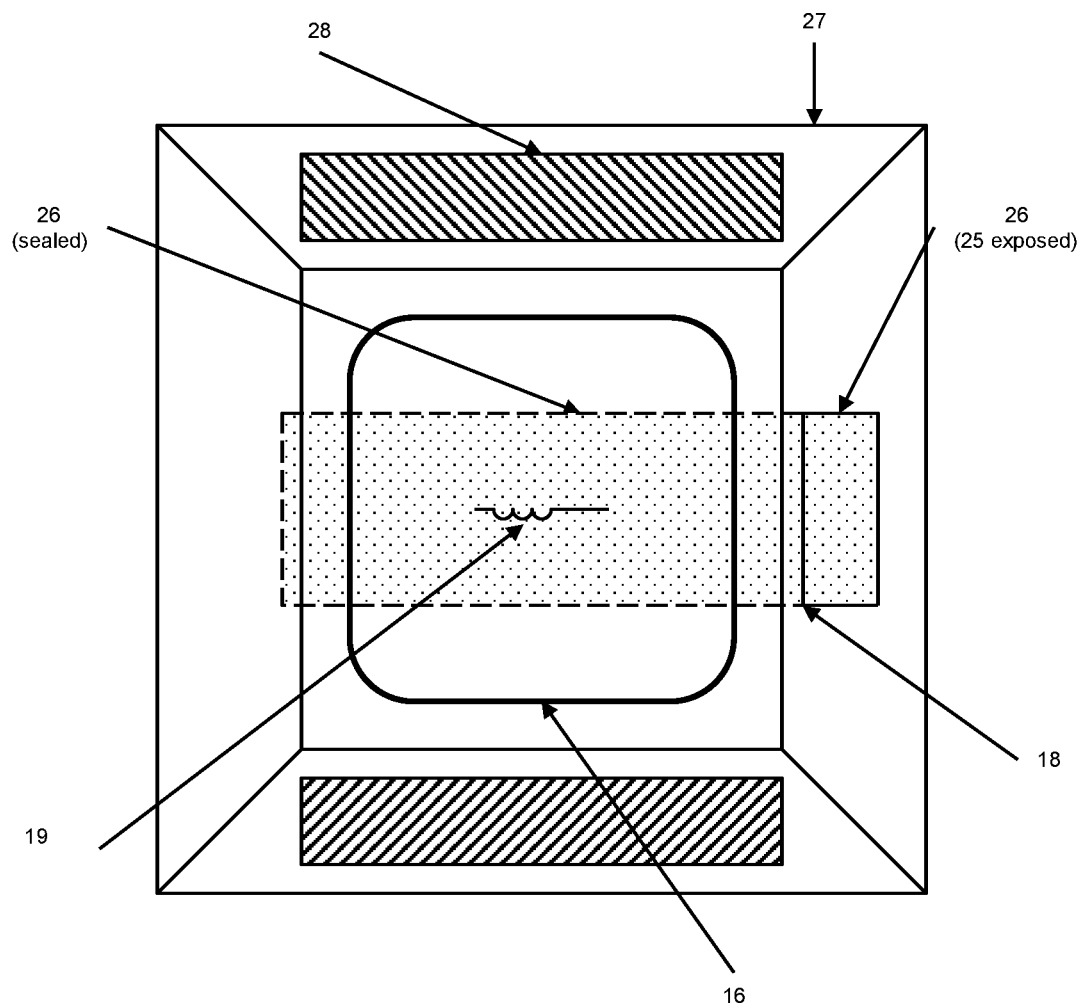
FIG. 4 is a top view of a roadway-based beacon thereof.
Figures 5, 6:
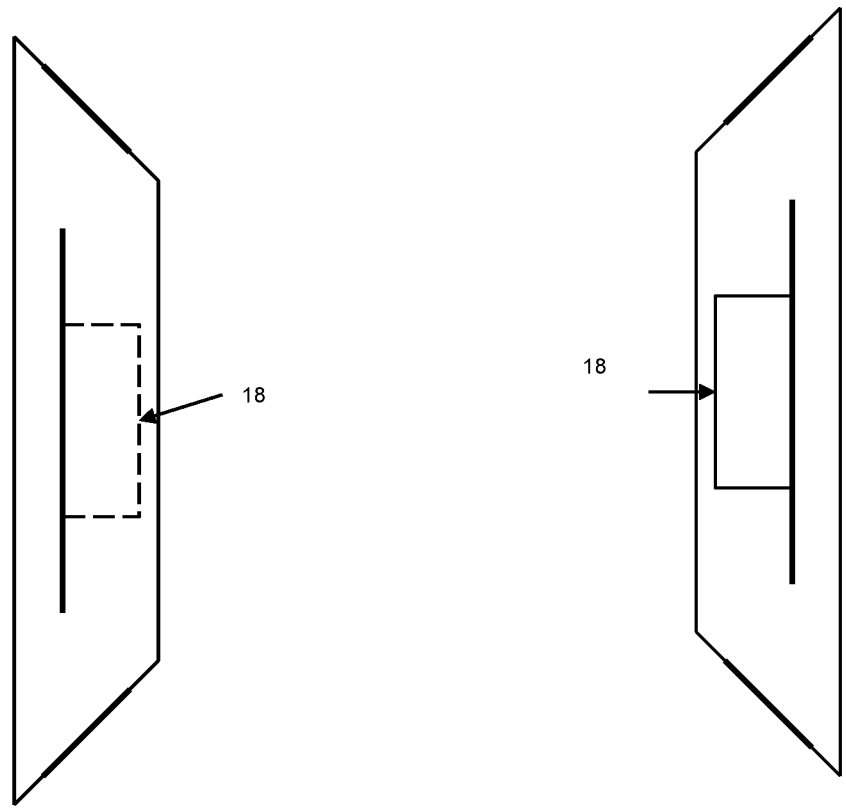
FIG. 5 is a front plan view of FIG. 4 thereof.
FIG. 6 is a rear plan view of FIG. 4 thereof.
Figure 7:
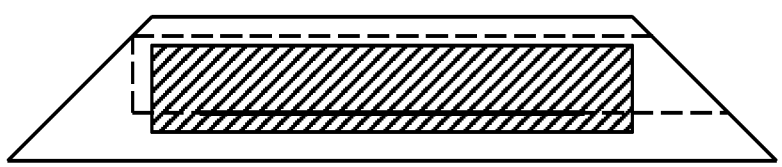
FIG. 7 is a first side elevation view of FIG. 4 thereof, with a second side being a mirror image thereof.

The roadway beacon components, most notably the printed circuit board, are potted in the housing cavity with a potting material. The potting material is preferably an epoxy material. The potting material protects the electronic components and other internal components of the roadway beacon from environmental conditions and physical shocks imparted to the housing. As shown in FIG. 4, at least a portion of the roadway beacon moisture sensor 25 remains exposed to the environmental elements.

In another embodiment, the housing 27 may further include at least one retroreflective element 28 or reflector. Preferably two retroreflective elements are used. The retroreflective elements are located on the housing side walls. The retroreflective element is preferably a retroreflective tape. Along with the two retroreflective elements, the housing shell may further be pigmented. At least one portion of a retroreflective element is visible on the housing to an approaching vehicle. Use of the retroreflective elements on the housing side walls is optional.

The adhesive member of the housing aids in adhering the roadway beacon to the road. The housing is preferably affixed to the road surface with tar so that at least a portion of the housing remains raised above the road surface similar to conventional raised road lane delineating reflectors or conventional raised pavement markers. Alternatively, the housing may be installed within a depression in the road so that the top of the housing is flush or recessed with the road surface.

The roadway beacon has at least one environment sensor for detecting, monitoring, and transmitting environment conditions to the vehicle adapter in real time. Two environment sensors are preferably used with the system. A first environment sensor is a temperature sensor 24. A second environment sensor is a moisture sensor 25.

Each roadway beacon has a temperature sensor 24 for detecting and monitoring the temperature conditions of the roadway and the ambient temperature in real time. The temperature sensor is preferably an array of thermistors. In a preferred embodiment, the array of thermistors has at least two thermistors, with each of the thermistors being positioned at different depths within the housing to detect the temperature change in the environment and on the road surface. Using two thermistors determines in which direction and the rate that the temperature is changing. The temperature sensor 24 is coupled to the beacon microcontroller 20. The beacon microcontroller measures the electrical resistance to yield the temperature information by measuring the voltage drop across the thermistor with an analog to digital converter. The temperature sensor may be a soldered component on the printed circuit board. The temperature data is nominally transmitted once as part of the beacon data packet by the second beacon antenna to the second adapter antenna whenever an equipped vehicle comes into close physical proximity with and pings the roadway beacon.

Each roadway beacon 15 has a moisture sensor 25 for detecting and monitoring the moisture conditions of the road and environment in real time. The moisture sensor is coupled to the beacon microcontroller 20. The moisture sensor is preferably a resistive sensor in the form of an exposed pair of electrodes. The electrical resistance between the two electrodes will change based on the amount of moisture collected between the two electrodes to yield a moisture content reading. The two electrodes are coupled to the printed circuit board 26, and are preferably plated metal or soldered on the printed circuit board. As depicted in FIG. 4, a substantial portion of the electronics board 26 is sealed, with at least a portion of the two electrodes 25 being positioned on the printed circuit board beyond the housing 27 cavity 18 and the potting material to expose the two electrodes 25 to the environment. The moisture data is nominally transmitted once as part of the beacon data packet by the second beacon antenna to the second adapter antenna whenever an equipped vehicle pings the roadway beacon.

Each roadway beacon has a lane management data structure for storing static data and dynamic data concerning lane management and traffic management information for the road in real time. The lane management data structure enumerates data that is digitally stored on the beacon microcontroller and beacon memory chips. The lane management data and the traffic management data are accessed by the beacon microcontroller and sent as part of the beacon data packet by the second beacon antenna to the vehicle adapter's second adapter antenna.

The static data for the lane management data structure includes data that is initially provided to the roadway beacon as a static parameter(s). The static data is permanently stored in the roadway beacon nominally during installation by a construction vehicle. The lane information most likely will not change during the roadway beacon's service life provided that the roadway beacon is not moved or repositioned after installation. The static parameter(s) may include, but are not limited to, lane number, the speed limit, special road type designation (HOV, school zone, bus zone, merge), and other parking designations. The static parameter(s) help communicate static data about a route and any challenging inter-lane positioning information to driver-operated, autonomous, and semi-autonomous equipped vehicles.

The dynamic data for the lane management data structure and traffic management data structure are data that can be selectively updated by authorized or privileged users in equipped vehicles. The dynamic data may be used as a digital traffic cone to denote different kinds of upcoming hazards and advisories. Examples of dynamic data parameters include, but are not limited to, temporary lane closure times and current status, specification of different types of hazards (construction, emergency, or other hazard), and temporary speed limits. Users of authorized or privileged equipped vehicles can program the lane management data structure of each roadway beacon by transmitting a command from the adapter microcontroller to the transceiver and second adapter antenna (adapter communication antenna) to the pinged roadway beacon's second beacon antenna as the authorized vehicle passes the roadway beacon. The transmitted command selectively changes the dynamic data of the roadway beacon thereby affecting traffic and lane management. General consumer equipped vehicles would receive the updated dynamic data from the roadway beacon during a ping during a subsequent pass to appropriately modify their traffic behavior. The dynamic data of the lane management data structure is transmitted by the authorized or privileged user via encrypted and identification-verified communication.

Each roadway beacon has a record-keeping data structure for storing information received about an equipped vehicle as the vehicle interacts with the roadway beacon in real time. The collected information is stored within the roadway beacon's external memory. The collected information includes, but is not limited to, each passing vehicle's VIN, velocity, timestamp, which side of the vehicle is making contact with the roadway beacon, and other characteristics that are self-reported by an equipped vehicle to the roadway beacon in its initial communication exchange. The record-keeping data is essentially recorded dynamic data that creates a dynamic roster of all vehicles passing thereby.

In yet another embodiment, each roadway beacon may further include at least two counters, with each counter being coupled to the record-keeping data structure, wherein one counter maps to each side of the roadway beacon to record total traffic vehicle volume counts for obtaining lane-specific traffic information. Access and transmission of the stored record-keeping data is restricted only to authorized and privileged users via the vehicle adapter and encrypted and identification-verified communication.

Each roadway beacon has a high-fidelity positioning member for storing the particular geographic location of the roadway beacon, and by extension, the location of an equipped vehicle, in at least GNSS-denied navigation environments and in GNSS-available navigation environments. When the roadway beacons are affixed or mounted along the road, each is essentially an absolute positioning device containing the accurate position of that roadway beacon. This geographic location is stored as static data within the roadway beacon's memory. Such information is transmitted in the beacon data packet to the vehicle adapter. This data is accessed from the nonvolatile memory by the roadway beacon microcontroller. When GNSS is available to a passing vehicle, the positioning member corroborates the geographic location of the roadway beacon for navigation. When in a GNSS-denied navigation environment, the positioning member is a sufficient substitute for navigation.

Each roadway beacon 15 has a first beacon antenna 16 for powering the roadway-based beacon 15 via energy transmitted from the first adapter antenna 2 of the vehicle adapter 1. The first beacon antenna is preferably a high frequency RF antenna. A preferred range of the high frequency antenna is approximately 3-30 MHz. A more preferred high frequency range for the antenna is approximately 10 MHz. The first beacon antenna 16 is essentially a power harvesting antenna 16. Having the power harvesting antenna operate over a large area aids in intercepting or capturing a large amount of power emitted by the vehicle adapter's 1 power emitting antenna 2. The roadway beacon 15 receives power via the power harvesting antenna 16, which is then rectified and regulated into a stable, low DC voltage to power the electronics of the roadway beacon 15. In another embodiment, a battery may also be used in concert with the power harvesting antenna and delivery system. The power consumption of each roadway beacon is suspended when the roadway beacon is not being pinged by a vehicle adapter. Memory is nominally written to before the roadway beacon shuts down so that the recently received data is retained in the beacon nonvolatile memory.

Each roadway beacon 15 has a second beacon antenna 19 for receiving communication or a data request from the vehicle adapter 1 and for transmitting a beacon data packet of the detected and collected information to the vehicle adapter's second adapter antenna (adapter communication antenna) 5. The second beacon antenna 19 is a beacon communication antenna 19 that is essentially an ultra high frequency or super high frequency two-way RF beacon communication antenna. This beacon communication antenna preferably uses ISM bands to send and receive data between the roadway beacon and the vehicle adapter. A preferred range for the beacon communication antenna is approximately in the 2.45 GHz or 5.8 GHz bands.

Each roadway beacon transmits a beacon data packet to the vehicle adapter for at least evaluation by the vehicle adapter's 1 microcontroller 7. The beacon data packet is communicated once per exchange with an equipped vehicle passing by and is nominally not transmitted to the same vehicle twice in the same setting. The beacon data packet from the roadway beacon contains at least high-fidelity location service data, temperature data (as part of the sensor data), moisture data (as part of the sensor data), and lane and traffic data. If the equipped vehicle is an authorized equipped vehicle, then the beacon's vehicle traffic records are also transmitted to the vehicle adapter's microcontroller 7 via the adapter transceiver 8. A single vehicle data request and a single beacon data packet are nominally sent and received, respectively, by the vehicle adapter and the roadway beacon. Because the communication period between pinging the roadway beacon and the vehicle adapter is small (i.e., seconds or fractions of a second), the response from the roadway beacon is nominal.

Figure 8:
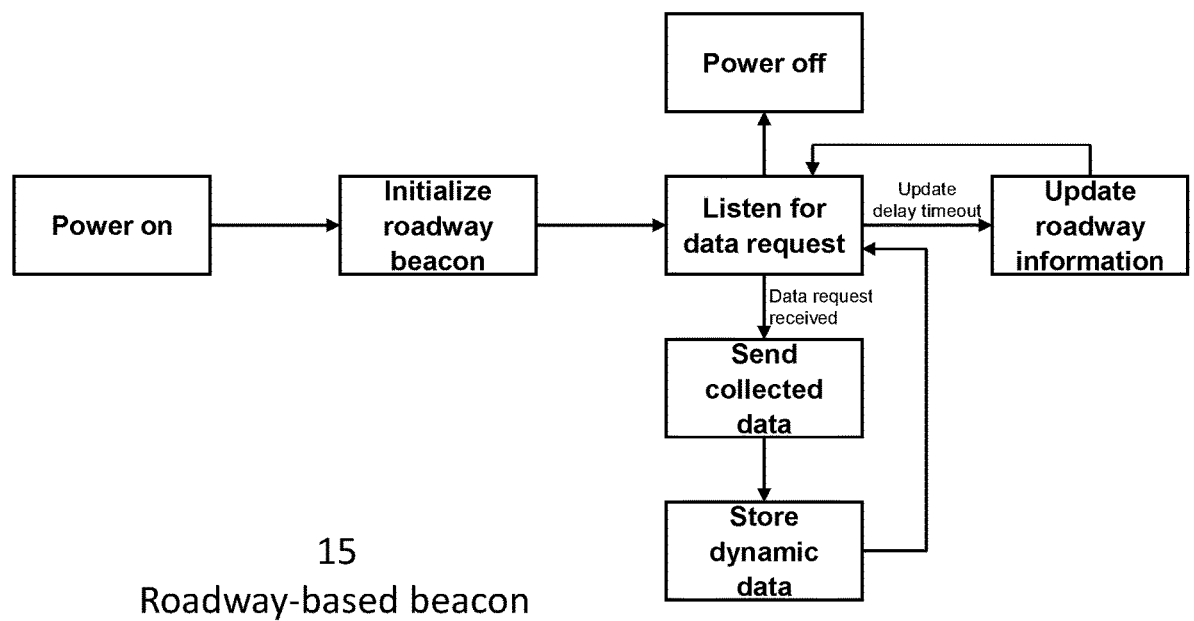
FIG. 8 is a schematic showing the process of the roadway-based beacon from a power on state to a power off state.

FIGS. 2 and 8 depict the method for using the vehicle-based adapter and the roadway-based beacon. For the vehicle adapter shown in FIG. 2, after the vehicle adapter is powered on, the vehicle adapter initializes. The vehicle adapter remains idle between vehicle information updates or when sending a data request to an available roadway beacon. If no response is received and the data request delay times out, the vehicle adapter sends an additional data request. If a response is received, then the vehicle adapter utilizes the received data from the roadway beacon before returning back to its idle state. If the vehicle information update delay times out, the vehicle information is updated. After the equipped vehicle is no longer supplying power to the vehicle adapter through the vehicle interface, then the adapter will power off.

For the roadway beacon shown in FIG. 8, the roadway beacon is powered once it is in close proximity to an equipped vehicle. After power is turned on, the roadway beacon initializes and listens for a data request from the equipped vehicle. If a data request from the vehicle adapter is received, the roadway beacon sends the collected data and stores dynamic data before returning to listen for another data request. Also, if while listening for a data request the update delay times out, the roadway information is also updated. If no data request is received, and the vehicle leaves the proximity of the roadway beacon, then the roadway beacon will power off. One example of a data request not being received by a particular roadway-based beacon is if the sender is no longer in close proximity to that particular beacon by the time the beacon's electronics initialize and begin listening for a data request.

FIGS. 4-7 depict the roadway beacon having a housing 27, a power harvesting antenna 16, a beacon communication antenna 19, two reflectors 28, and an electronics board 26. The housing 27 further defines an interior cavity 18 for containing the electronics board 26 to which the electronics are coupled. The power harvesting antenna 16 may be embedded in the beacon housing 27 and is coupled to the electronics board 26. The beacon communication antenna 19 is mounted on the electronics board 26. At least one portion of the electronics board 26 is exposed from the side of the housing 27. In this embodiment, at least one portion of the moisture sensor 25 would be exposed from the housing 27. The remainder of the electronics board 26 is sealed within the housing 27 cavity 18. The two opposing side walls each depict a retroreflector 28. The dotted lines on the figure represent the cross-section or the presence of a cavity 18 within the housing 27.

Figure 9:
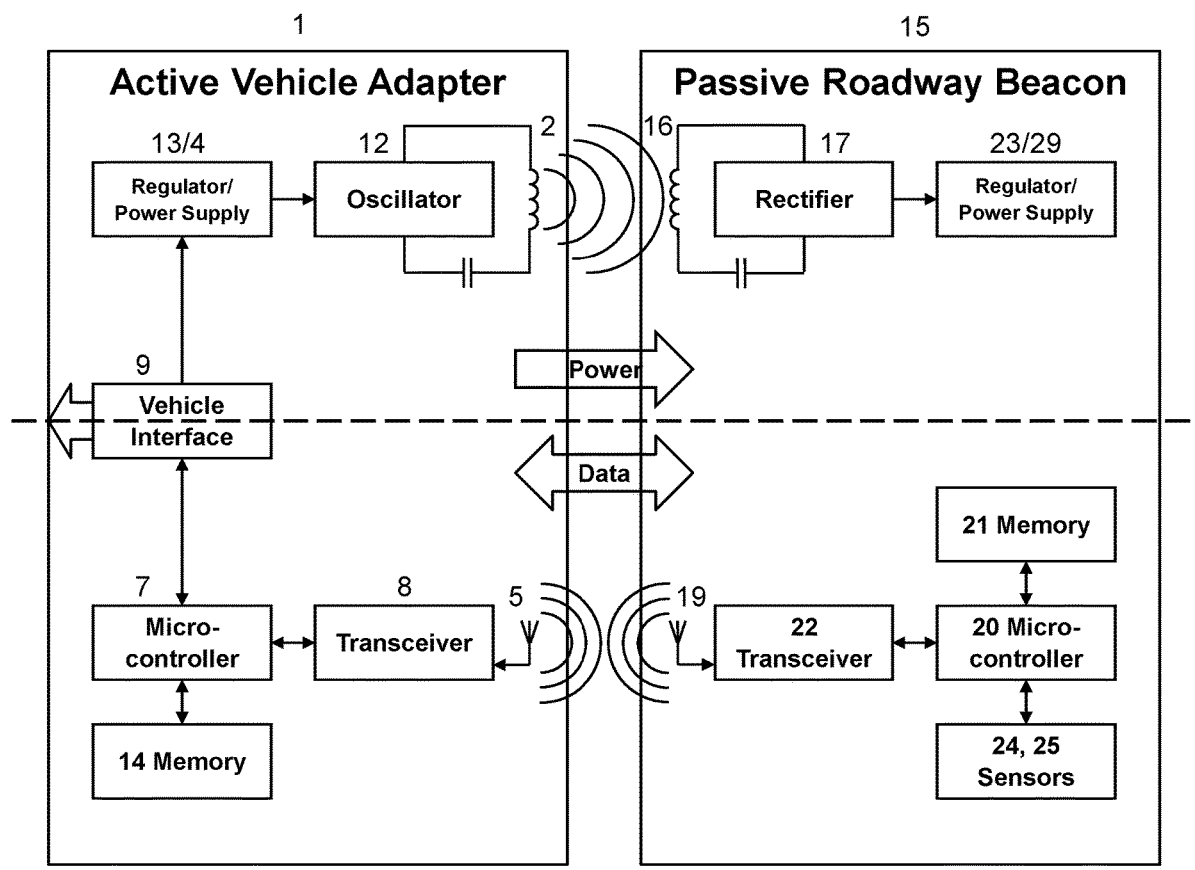
FIG. 9 is a schematic showing the vehicle-based adapter in communication with the roadway-based beacon.

FIG. 9 depicts a schematic of an embodiment of the invention. Here, the beacon transceiver 22 is coupled to and in communication with the roadway beacon communication antenna 19. The beacon microcontroller 20 is coupled to and in communication with the beacon's nonvolatile memory 21, each of the sensors 24, 25, and the beacon transceiver 22. The beacon microcontroller 20 is powered by the power harvesting antenna 16, which is the power source for the roadway beacon 15. From the equipped vehicle side, the adapter microcontroller 7 is coupled to and in communication with the vehicle adapter transceiver 8, the vehicle nonvolatile memory 14, and the vehicle interface 9. The vehicle adapter 1 is powered by the vehicle's existing power system through the vehicle interface 9.

Figure 10:
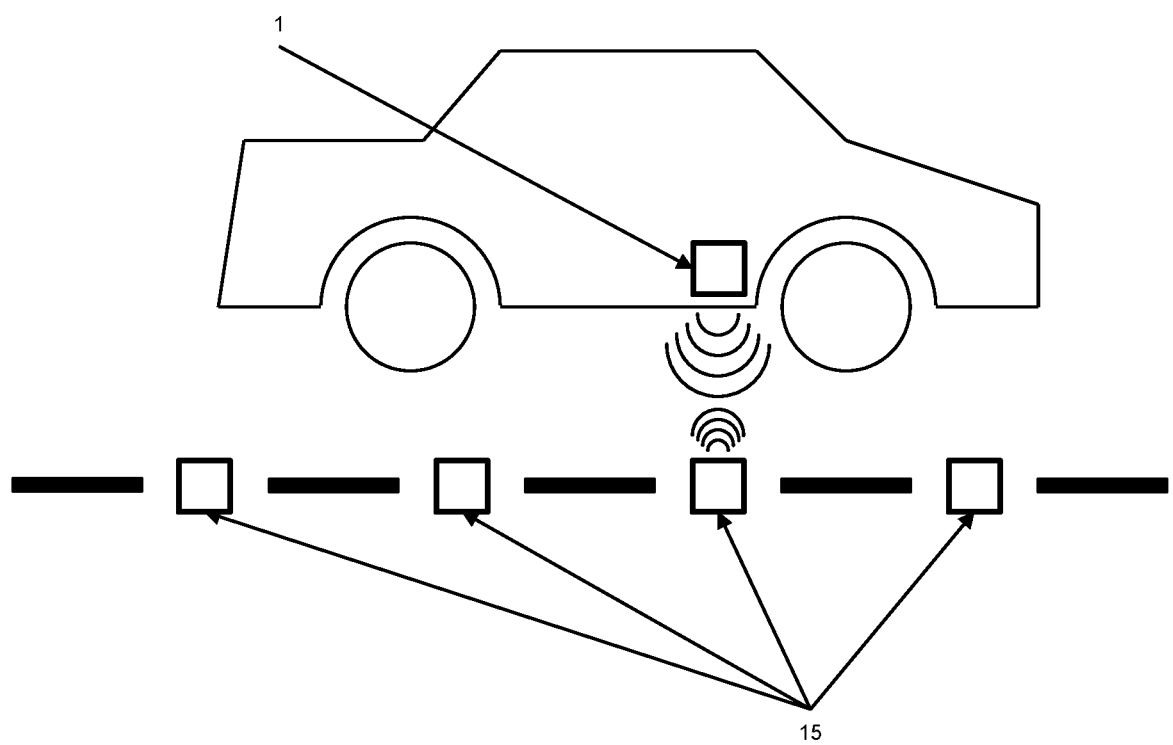
FIG. 10 is a schematic showing a vehicle equipped with an adapter communicating with a beacon among a string of inactive beacons on the road.

FIG. 9 further depicts the system providing the dual direction exchange of data between the vehicle adapter and the roadway beacon, and the single direction power exchange from the vehicle adapter to the roadway beacon with the vehicle adapter oscillator 12 powering the roadway beacon rectifier 17, with the first adapter antenna 2 (power emitting antenna) and first beacon antenna 16 (power harvesting antenna) as intermediaries. Power from the vehicle adapter to the roadway beacon powers then activates the roadway beacon. Once activated, the roadway beacon microcontroller 20 and beacon memory 21 collects and stores data obtained from the environment sensors 24, 25. After receiving a data request packet from the vehicle adapter, the beacon wirelessly transmits the data via a single beacon data packet to the vehicle adapter microcontroller via the respective transceivers and antennas. The vehicle interface is in communication with the vehicle microcontroller. FIG. 10 depicts an illustrative equipped vehicle in communication with a roadway-based beacon among a string of inactive beacons on the roadway.

In one embodiment, a vehicle-roadway interface for power and data exchange with roadway sensors system for use with a road or road surface with at least one vehicle, the system comprising:

a. at least one active vehicle-based adapter removably mounted to the at least one vehicle forming an at least one equipped vehicle, the at least one vehicle-based adapter powered from the at least one vehicle's existing power and data bus, with the at least one vehicle-based adapter comprising: a first adapter antenna for providing direct wireless power to each of a plurality of passive roadway-based beacons when the at least one vehicle-based adapter and the plurality of passive roadway-based beacons are in close physical proximity; a second adapter antenna for dual directional wireless communication with a second beacon antenna, with an adapter microcontroller being coupled to an adapter transceiver and to a vehicle interface, wherein the first adapter antenna further includes an oscillator and an adapter regulator; and b. the plurality of passive roadway-based beacons being selectively positioned along the road, each of the plurality of passive roadway-based beacons comprising: a temperature sensor for detecting an ambient temperature and a road surface temperature in real time and transmitting as a temperature data; a moisture sensor for detecting a moisture condition of the road in real time and transmitting as a moisture data; an at least one beacon data packet having the temperature data, the moisture data, at least one lane data containing a lane management data structure for storing static data and dynamic data in real time, a record data containing a record-keeping data structure for collecting and storing information about the at least one equipped vehicle which interacts and engages with the plurality of passive roadway-based beacons in real time, and a location data having a high-fidelity positioning record for use in an at least GNSS-denied navigation environment; a first beacon antenna which obtains power from the first adapter antenna, with the roadway-based beacon remaining unpowered until engaged with the at least one vehicle-based adapter, with the second beacon antenna having a beacon transceiver for dual directional transmission of the at least one beacon data packet and receipt of the at least one vehicle data request wirelessly in real time during interaction or ping with the at least one equipped vehicle, a beacon microcontroller, and a beacon nonvolatile memory, wherein the at least one beacon data packet is transmitted in real time as the equipped vehicle passes a particular one of the plurality of passive roadway-based beacons;

c. wherein the beacon microcontroller being coupled to each of the beacon transceiver, the beacon nonvolatile memory, the temperature sensor, and the moisture sensor; and wherein the at least one active vehicle-based adapter remains in an idle state as power is continuously transmitted from the power emitting antenna, or between vehicle information updates, or sending the at least one vehicle data request to each of the plurality of passive roadway-based beacons in close proximity with the at least one active vehicle-based adapter;

d. wherein if no response is received and the at least one vehicle data request delay times out, the at least one active vehicle-based adapter sends an additional at least one vehicle data request, and if a response is received, then the at least one vehicle-based adapter utilizes the received data from the respective plurality of passive roadway-based beacons before returning back to its idle state, and wherein, alternatively, if the vehicle information update delay times out, the vehicle information is updated, and wherein after the at least one equipped vehicle no longer supplies power to the at least one active vehicle-based adapter through the vehicle interface, the at least one active vehicle-based adapter will power off;

e. wherein upon interaction with the first adapter antenna, each of the plurality of passive roadway-based beacons receives enough transmitted power through the first beacon antenna to activate an idle beacon microcontroller, the beacon transceiver, the beacon nonvolatile memory, the temperature sensor, and the moisture sensor to take measurements and to retrieve data for the at least one beacon data packet;

f. wherein the at least vehicle data request is intermittent and is received by the second beacon antenna and processed to determine the authority of the at least one equipped vehicle, with pertinent authorized information being stored in the beacon nonvolatile memory; wherein in response, each of the plurality of passive roadway-based beacons transmits the at least one data packet through the beacon communication antenna, containing the appropriate data collected during activation, to the at least one active vehicle-based adapter's adapter communication antenna; and wherein whenever the distance between the at least one active vehicle-adapter and the power harvesting antenna of a particular of the plurality of passive roadway-based beacons exceeds the ping or interaction range for the power harvesting antenna, each of the plurality of roadway-based beacons suspends data collection activity and powers down to an idle state until later powered and requested by a different of the at least one equipped vehicle.

In yet another embodiment, a vehicle-roadway interface for power and data exchange with roadway sensors system for use on a road or road surface with at least one vehicle, the system comprising:

a. two independent active vehicle-based adapters each being removably mounted to the at least one vehicle forming an at least one equipped vehicle and a plurality of passive roadway-based beacons each being affixed to or within the road surface;

b. each of the two active vehicle-based adapters comprising: a first adapter antenna having a high frequency being electrically fed by an adapter oscillator for providing direct wireless power to each of the plurality of passive roadway-based beacons during a ping or interaction, the active vehicle-based adapter powered from the at least one equipped vehicle's existing power and data bus through a vehicle interface and regulated by an adapter regulator; a second adapter antenna having an ultra high frequency or a super high frequency being capable of dual directional communication with each of the plurality of passive roadway-based beacons to transmit an at least one vehicle data request and to receive an at least one beacon data packet for a data exchange; an adapter microcontroller coupled to each of an adapter transceiver for the dual directional data exchange, to the vehicle interface, to an adapter nonvolatile memory, and to the second adapter antenna; and c. each of the plurality of passive roadway-based beacons comprising:
  i. a temperature sensor for detecting a road temperature and an ambient temperature in real time, transmitting as a temperature data; a moisture sensor for detecting a moisture condition of the road and the environment in real time, transmitting as a moisture data; a lane management data structure for storing static data and dynamic data concerning lane management and traffic management for the road in real time, transmitting as a lane data; a record-keeping data structure for collecting and storing information about vehicles equipped with each active vehicle-based adapter as those vehicles interact with each of the plurality of roadway-based beacons on the road in real time, transmitting as a record data; a high-fidelity positioning record for providing the geographic location of the roadway-based beacon in an at least GNSS-denied navigation environment, transmitting as a location data;
  ii. a first beacon antenna having a high frequency for receiving power from the first adapter antenna for powering the plurality of passive roadway-based beacons and for forming a beacon power source, wherein the first beacon antenna includes a beacon rectifier and a beacon regulator; a second beacon antenna having an ultra high frequency or a super high frequency for transmitting the at least one beacon data packet to the second adapter antenna with the at least one beacon data packet containing the temperature data, the moisture data, the lane data, the record data, and the location data, and for receiving the at least one vehicle data request from the second adapter antenna; the beacon rectifier coupled to the adapter oscillator for direct wireless powering of each of the plurality of passive roadway-based beacons, with the beacon regulator regulating this power and acting as a power source for the beacon microcontroller, which is coupled to a beacon nonvolatile memory, the temperature sensor, the moisture sensor, and a beacon transceiver;
d. wherein upon interaction with the first adapter antenna, each of the plurality of passive roadway-based beacons receives enough transmitted power through the first beacon antenna to activate an idle beacon microcontroller, the beacon transceiver, the beacon nonvolatile memory, the temperature sensor, and the moisture sensor to take measurements and to retrieve data for the at least one beacon data packet; wherein each of the at least one vehicle data request is intermittent and is received by the second beacon antenna and processed to determine the authority of the at least one equipped vehicle, with pertinent information being stored in the beacon nonvolatile memory;
e. wherein in response, the plurality of passive roadway-based beacons transmits the at least one data packet through the beacon communication antenna containing the appropriate data collected during activation to the at least one vehicle-based adapter's adapter communication antenna; wherein the two independent vehicle-based adapters provide double the information throughput with the plurality of passive roadway-based beacons, enumerating up to three lanes of the temperature data, the moisture data, the lane data, the record data, and the location data total;
f. wherein whenever the distance between the at least one vehicle-adapter and the power harvesting antenna exceeds the ping or interaction range for the power harvesting antenna, each of the plurality of passive roadway-based beacons suspends data collection activity and powers down to an idle state until later powered and requested by a different of the at least one equipped vehicle;
g. wherein the at least one active vehicle-based adapter remains in an idle state as power is continuously transmitted from the power emitting antenna, or between vehicle information updates, or sending the at least one vehicle data request to each of the plurality of passive roadway-based beacons in close proximity with the at least one active vehicle-based adapter; and
h. wherein if no response is received and the at least one vehicle data request delay times out, the at least one active vehicle-based adapter sends an additional at least one vehicle data request, and if a response is received, then the at least one vehicle-based adapter utilizes the received data from the respective plurality of passive roadway-based beacons before returning back to its idle state, and wherein, alternatively, if the vehicle information update delay times out, the vehicle information is updated, and wherein after the at least one equipped vehicle no longer supplies power to the at least one active vehicle-based adapter through the vehicle interface, the at least one active vehicle-based adapter will power off.

Those skilled in the art who have the benefit of this disclosure will appreciate that it may be used as the creative basis for designing devices or methods similar to those disclosed herein, or to design improvements to the invention disclosed herein; such new or improved creations should be recognized as dependent upon the invention disclosed herein to the extent of such reliance upon this disclosure.

I claim:

1. A vehicle-roadway interface for power and data exchange with roadway sensors system for use on a roadway or a road surface with at least one vehicle, the system comprising:
   a. a first node of the system having at least one active vehicle-based adapter removably mounted to the at least one vehicle forming an at least one equipped vehicle and a second node of the system having a plurality of passive roadway-based beacons each being affixed to or within the road surface;
   b. the at least one active vehicle-based adapter comprising:
     i. a power emitting antenna providing a direct wireless beacon power source to a power harvesting antenna of each of the plurality of passive roadway-based beacons during interactive close proximity between the at least one equipped vehicle and each of the plurality of passive roadway-based beacons, and coupling to an existing power and data bus of the at least one equipped vehicle for use as an adapter power source for the at least one active vehicle-based adapter;
     ii. an adapter communication antenna having an adapter transceiver for dual directional transmission of an at least one vehicle data request to each of the plurality of passive roadway-based beacons and receipt of an at least one beacon data packet from each of the plurality of passive roadway-based beacons; and
     iii. an adapter processing member coupled to the adapter transceiver and to a vehicle interface for processing information obtained from the at least one beacon data packet and providing one or more commands through the at least one vehicle data request to each of the plurality of passive roadway-based beacons;
   c. each of the plurality of passive roadway-based beacons comprising:
     i. a temperature sensor for detecting an ambient temperature and a road surface temperature in real time and transmitting as a temperature data;
     ii. a moisture sensor for detecting a moisture condition of the road in real time and transmitting as a moisture data;
     iii. the at least one beacon data packet having the temperature data, the moisture data, at least one lane data containing a lane management data structure for storing static data and dynamic data in real time, a record data containing a record-keeping data structure for collecting and storing information about the at least one equipped vehicle which interacts and engages with the plurality of passive roadway-based beacons in real time, and a location data having a high-fidelity positioning record for use in an at least GNSS-denied navigation environment;

iv. the power harvesting antenna obtaining power from the power emitting antenna for powering at least a beacon processing member, a beacon transceiver, and a beacon nonvolatile memory;

v. beacon communication antenna having the beacon transceiver for dual directional transmission of the at least one beacon data packet and receipt of the at least one vehicle data request wirelessly in real time during interaction with the at least one equipped vehicle; and vi. the beacon processing member being coupled to the beacon transceiver and the beacon nonvolatile memory;

d. wherein the at least one active vehicle-based adapter remains in an idle state as power is continuously transmitted from the power emitting antenna, or between vehicle information updates, or sending the at least one vehicle data request to each of the plurality of passive roadway-based beacons in close proximity with the at least one active vehicle-based adapter;

e. wherein if no response is received and the at least one vehicle data request delay times out, the at least one active vehicle-based adapter sends an additional at least one vehicle data request, and if a response is received, then the at least one active vehicle-based adapter utilizes the received data from respective plurality of passive roadway-based beacons before returning back to its idle state, wherein, alternatively, if the vehicle information update delay times out, the vehicle information is updated, and wherein after the at least one equipped vehicle no longer supplies power to the at least one active vehicle-based adapter through the vehicle interface, the at least one active vehicle-based adapter will power off;

f. wherein upon interaction or pinging with the power emitting antenna, the power harvesting antenna of each of the plurality of passive roadway-based beacons receives enough transmitted power to activate an idle beacon microcontroller, the beacon transceiver, the beacon nonvolatile memory, the temperature sensor, and the moisture sensor to take measurements and to retrieve data for the at least one beacon data packet;

g. wherein the at least one vehicle data request is intermittent and is received by the beacon communication antenna and processed to determine an authority of the at least one equipped vehicle, with pertinent authorized information being stored in the beacon nonvolatile memory;

h. wherein in response, each of the plurality of passive roadway-based beacons transmits the at least one beacon data packet through the beacon communication antenna which contains the appropriate data collected during activation to the at least one active vehicle-based adapter's adapter communication antenna; and i. wherein whenever a distance between the at least one active vehicle-based adapter and the power harvesting antenna of each of the plurality of passive roadway-based beacons exceeds the ping or interaction range for the power harvesting antenna, each of the plurality of passive roadway-based beacons suspends data collection activity and powers down to an idle state until later powered and requested by a different the at least one equipped vehicle.

2. The system of claim 1, the power emitting antenna of the at least one active vehicle-based adapter further comprising an oscillator for transmitting power in a high frequency range to the power harvesting antenna, and an adapter regulator for controlling an amount of power used to operate the at least one active vehicle-based adapter.

3. The system of claim 1, the adapter processing member comprising an adapter microcontroller coupled to the adapter transceiver and the vehicle interface for processing the at least one beacon data packet and the at least one vehicle data request.

4. The system of claim 1, the power harvesting antenna of each of the plurality of passive roadway-based beacons further comprising a beacon rectifier and a beacon regulator for rectifying and regulating the received power to a stable, low DC voltage power source for each of the plurality of passive roadway-based beacons.

5. The system of claim 1, the beacon communication antenna further comprising an ultra high frequency beacon antenna or a super high frequency beacon antenna to transmit and to receive the at least one beacon data packet and the at least one vehicle data request; and the adapter communication antenna further comprising an ultra high frequency adapter antenna or a super high frequency adapter antenna to transmit and to receive the at least one vehicle data request and the at least one beacon data packet.

6. The system of claim 1, the beacon processing member further comprising a beacon microcontroller, the beacon nonvolatile memory, and the beacon transceiver.

7. A vehicle-roadway interface for power and data exchange with roadway sensors system for use with a road or road surface with at least one vehicle, the system comprising:

a. at least one active vehicle-based adapter removably mounted to the at least one vehicle forming an at least one equipped vehicle, the at least one active vehicle-based adapter powered from at least one vehicle's existing power and data bus, with the at least one active vehicle-based adapter comprising:

i. a first adapter antenna for providing direct wireless power to each of a plurality of passive roadway-based beacons when the at least one active vehicle-based adapter and the plurality of passive roadway-based beacons are in close physical proximity;

ii. a second adapter antenna for dual directional wireless communication with a second beacon antenna, iii. with an adapter microcontroller being coupled to an adapter transceiver and to a vehicle interface, and iv. wherein the first adapter antenna further includes an oscillator and an adapter regulator;

b. the plurality of passive roadway-based beacons being selectively positioned along the road, each of the plurality of passive roadway-based beacons comprising:

i. a temperature sensor for detecting an ambient temperature and a road surface temperature in real time and transmitting as a temperature data;

ii. a moisture sensor for detecting a moisture condition of the road in real time and transmitting as a moisture data;

iii. an at least one beacon data packet having the temperature data, the moisture data, at least one lane data containing a lane management data structure for storing static data and dynamic data in real time, a record data containing a record-keeping data structure for collecting and storing information about the at least one equipped vehicle which interacts and engages with the plurality of passive roadway-based beacons in real time, and a location data having a high-fidelity positioning record for use in an at least GNSS-denied navigation environment;

iv. a first beacon antenna obtains power from the first adapter antenna, with the passive roadway-based beacon remaining unpowered until engaged with the at least one active vehicle-based adapter, with the second beacon antenna having a beacon transceiver for dual directional transmission of the at least one beacon data packet and receipt of at least one vehicle data request wirelessly in real time during interaction or ping with the at least one equipped vehicle, a beacon microcontroller, and a beacon nonvolatile memory, wherein the at least one beacon data packet is transmitted in real time as the at least one equipped vehicle passes a particular one of the plurality of passive roadway-based beacons; and v. wherein the beacon microcontroller being coupled to each of the beacon transceiver, the beacon nonvolatile memory, the temperature sensor, and the moisture sensor; and c. wherein the at least one active vehicle-based adapter remains in an idle state as power is continuously transmitted from a power emitting antenna, or between vehicle information updates, or sending the at least one vehicle data request to each of the plurality of passive roadway-based beacons in close proximity with the at least one active vehicle-based adapter;

d. wherein if no response is received and the at least one vehicle data request delay times out, the at least one active vehicle-based adapter sends an additional at least one vehicle data request, and if a response is received, then the at least one active vehicle-based adapter utilizes the received data from respective plurality of passive roadway-based beacons before returning back to its idle state, wherein, alternatively, if the vehicle information update delay times out, the vehicle information is updated, and wherein after the at least one equipped vehicle no longer supplies power to the at least one active vehicle-based adapter through the vehicle interface, the at least one active vehicle-based adapter will power off;

e. wherein upon interaction with the first adapter antenna, each of the plurality of passive roadway-based beacons receives enough transmitted power through the first beacon antenna to activate an idle beacon microcontroller, the beacon transceiver, the beacon nonvolatile memory, the temperature sensor, and the moisture sensor to take measurements and to retrieve data for the at least one beacon data packet;

f. wherein the at least one vehicle data request is intermittent and is received by the second beacon antenna and processed to determine an authority of the at least one equipped vehicle, with pertinent authorized information being stored in the beacon nonvolatile memory;

g. wherein in response, each of the plurality of passive roadway-based beacons transmits the at least one data packet through a beacon communication antenna, containing the appropriate data collected during activation, to the at least one active vehicle-based adapter's adapter communication antenna; and h. wherein whenever a distance between the at least one active vehicle-adapter and a power harvesting antenna of a particular of the plurality of passive roadway-based beacons exceeds the ping or interaction range for the power harvesting antenna, each of the plurality of passive roadway-based beacons suspends data collection activity and powers down to an idle state until later powered and requested by a different of the at least one equipped vehicle.

8. The system of claim 7, wherein the at least one vehicle comprising a first active vehicle-based adapter removably mounted to a first portion of the at least one equipped vehicle and a second active vehicle-based adapter removably mounted to a second portion of the at least one equipped vehicle, and wherein the first and second active vehicle-based adapters provide double the information throughput with the plurality of passive roadway-based beacons on the road, enumerating up to three lanes of the temperature data, the moisture data, a lane data, the record data, and a location data total.

9. A vehicle-roadway interface for power and data exchange with roadway sensors system for use on a road or road surface with at least one vehicle, the system comprising:

a. two independent active vehicle-based adapters each being removably mounted to the at least one vehicle forming an at least one equipped vehicle and a plurality of passive roadway-based beacons each being affixed to or within the road surface;

b. each of the two independent active vehicle-based adapters comprising:
 i. a first adapter antenna having a high frequency being electrically fed by an adapter oscillator for providing direct wireless power to each of the plurality of passive roadway-based beacons during a ping or interaction, the each active vehicle-based adapter powered from at least one equipped vehicle's existing power and data bus through a vehicle interface and regulated by an adapter regulator;
 ii. a second adapter antenna having an ultra high frequency or a super high frequency being capable of dual directional communication with each of the plurality of passive roadway-based beacons to transmit an at least one vehicle data request and to receive an at least one beacon data packet for a data exchange; and
 iii. an adapter microcontroller coupled to each of an adapter transceiver for the dual directional data exchange, to the vehicle interface, to an adapter nonvolatile memory, and to the second adapter antenna;

c. each of the plurality of passive roadway-based beacons comprising:
 i. a temperature sensor for detecting a road temperature and an ambient temperature in real time, transmitting as a temperature data;
 ii. a moisture sensor for detecting a moisture condition of the road and an environment in real time, transmitting as a moisture data;
 iii. a lane management data structure for storing static data and dynamic data concerning lane management and traffic management for the road in real time, transmitting as a lane data;
 iv. a record-keeping data structure for collecting and storing information about vehicles equipped with each active vehicle-based adapter as those vehicles interact with each of the plurality of passive roadway-based beacons on the road in real time, transmitting as a record data;
 v. a high-fidelity positioning record for providing the geographic location of the passive roadway-based beacon in an at least GNSS-denied navigation environment, transmitting as a location data;
 vi. a first beacon antenna having a high frequency for receiving power from the first adapter antenna for powering the plurality of passive roadway-based beacons and for forming a beacon power source, wherein the first beacon antenna includes a beacon rectifier and a beacon regulator;
vii. a second beacon antenna having an ultra high frequency or a super high frequency for transmitting the at least one beacon data packet to the second adapter antenna with the at least one beacon data packet containing the temperature data, the moisture data, the lane data, the record data, and the location data, and for receiving the at least one vehicle data request from the second adapter antenna; and
viii. the beacon rectifier coupled to the adapter oscillator for direct wireless powering of each of the plurality of passive roadway-based beacons, with the beacon regulator regulating this power and acting as a power source for the beacon microcontroller, which is coupled to a beacon nonvolatile memory, the temperature sensor, the moisture sensor, and a beacon transceiver;
d. wherein upon interaction with the first adapter antenna, each of the plurality of passive roadway-based beacons receives enough transmitted power through the first beacon antenna to activate an idle beacon microcontroller, the beacon transceiver, the beacon nonvolatile memory, the temperature sensor, and the moisture sensor to take measurements and to retrieve data for the at least one beacon data packet;
e. wherein each of the at least one vehicle data request is intermittent and is received by the second beacon antenna and processed to determine an authority of the at least one equipped vehicle, with pertinent information being stored in the beacon nonvolatile memory;
f. wherein in response, the plurality of passive roadway-based beacons transmits the at least one data packet through a beacon communication antenna containing the appropriate data collected during activation to the at least one active vehicle-based adapter's adapter communication antenna;
g. wherein the two independent active vehicle-based adapters provide double the information throughput with the plurality of passive roadway-based beacons, enumerating up to three lanes of the temperature data, the moisture data, the lane data, the record data, and a location data total;
h. wherein whenever a distance between the at least one active vehicle-based adapter and a power harvesting antenna exceeds a ping or interaction range for the power harvesting antenna, each of the plurality of passive roadway-based beacons suspends data collection activity and powers down to an idle state until later powered and requested by a different of the at least one equipped vehicle;
i. wherein at least one active vehicle-based adapter remains in an idle state as power is continuously transmitted from a power emitting antenna, or between vehicle information updates, or sending the at least one vehicle data request to each of the plurality of passive roadway-based beacons in close proximity with the at least one active vehicle-based adapter; and
j. wherein if no response is received and the at least one vehicle data request delay times out, the at least one active vehicle-based adapter sends an additional at least one vehicle data request, if a response is received, then the at least one active vehicle-based adapter utilizes the received data from respective plurality of passive roadway-based beacons before returning back to its idle state, wherein, alternatively, if the vehicle information update delay times out, the vehicle information is updated, and wherein after the at least one equipped vehicle no longer supplies power to the at least one active vehicle-based adapter through the vehicle interface, the at least one active vehicle-based adapter will power off.

10. The system of claim 9, wherein the two independent active vehicle-based adapters comprising a first active vehicle-based adapter being removably mounted to a first lower portion of the at least one equipped vehicle and a second active vehicle-based adapter being removably mounted to a second lower portion of the at least one equipped vehicle.

11. The system of claim 9, wherein the first adapter antenna of each of the at least one active vehicle-based adapter is the power emitting antenna that nominally operates in a high frequency radio regime, that continuously transmits power for receipt by the first beacon antenna and the beacon rectifier of one of the plurality of passive roadway-based beacons while the at least one equipped vehicle passes, and that the second adapter antenna intermittently transmits the at least one vehicle data request, while the adapter regulator simultaneously regulates the power provided to operate the adapter microcontroller, the adapter transceiver, the adapter nonvolatile memory, and the vehicle interface.

12. The system of claim 9, each of the plurality of passive roadway-based beacons further comprising a housing having a single, hollow, interior cavity for containing at least a portion of the beacon microcontroller, the temperature sensor, the moisture sensor, the first beacon antenna, the second beacon antenna, the beacon transceiver, and the beacon nonvolatile memory, with at least a portion of each of the temperature sensor and the moisture sensor being exposed outside the housing cavity.

13. The system of claim 12, the housing of each of the plurality of passive roadway-based beacons further comprising an adhesive member for affixing each of the plurality of passive roadway-based beacons to the road surface.

14. The system of claim 12, the temperature sensor further comprising an array of thermistors, with each of the thermistors being positioned at different depths within the housing to detect the temperature change in the environment and on the road surface.

15. The system of claim 9, the lane management data structure and a traffic management data structure each comprising dynamic data used as a digital traffic cone to denote different kinds of upcoming hazards and advisories.

* * * * *